Patented Jan. 12, 1926.

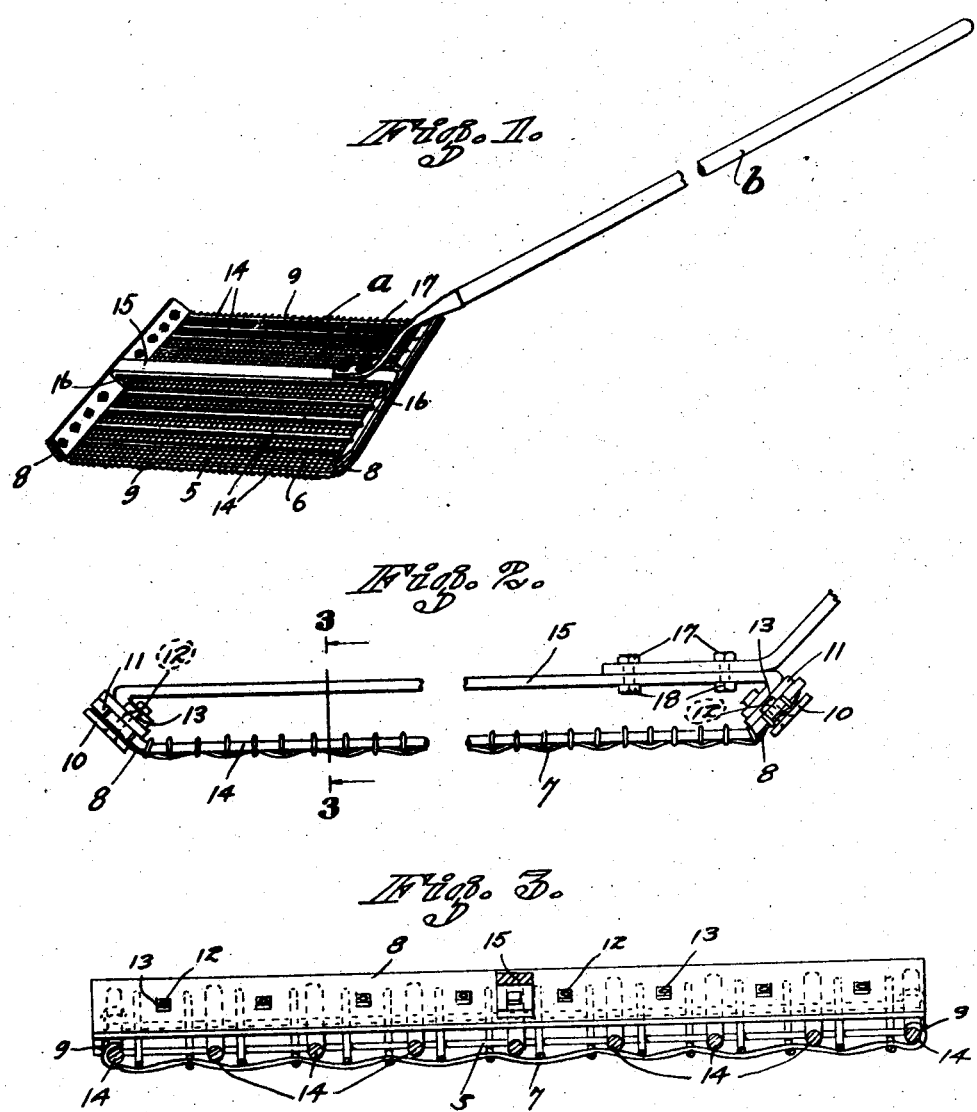

1,569,421

UNITED STATES PATENT OFFICE.

MANUEL T. COELHO, OF REDWOOD CITY, CALIFORNIA.

LAWN-DRESSING IMPLEMENT.

Application filed April 8, 1925. Serial No. 21,710.

*To all whom it may concern:*

Be it known that I, MANUEL T. COELHO, a citizen of the Republic of Portugal, and a resident of Redwood City, in the county of San Mateo and State of California, have invented a new and useful Improvement in Lawn-Dressing Implements, of which the following is a specification.

This invention relates to improvements in implements for use in connection with the dressing of grass lands such as lawns, putting-greens and the like.

The general object of the invention is to effect the uniform and expeditious distribution of top dressing upon grass land and at the same time to provide for working or directing such dressing downwardly and toward the roots of the grass and into depressions in the surface of the ground.

The above and other objects are accomplished by instrumentalities pointed out in the following specification.

The invention is clearly defined in the claims.

A satisfactory embodiment of the invention is illustrated in the accompanying drawings forming part of the specification and in which—

Figure 1 is a contracted perspective of the invention.

Figure 2 is a contracted side elevation of the body and a portion of the handle on a slightly larger scale than shown in Figure 1, and Figure 3 is a cross-section on the line 3—3 of Figure 2, looking in the direction of the arrows.

The device of this invention consists of a body portion *a* and a handle portion *b*. The intermediate portion 5 of the body is provided with a number of openings 6 and its lower face is made of transverse and longitudinal protuberations 7. The intermediate portion 5 is provided for bearing directly on the ground and for sliding thereover and to facilitate this sliding movement the opposite end portions 8 are turned upwardly so that the edges will be elevated and kept from possible impingement with the ground. The lateral edges 9 of the body are also bent upwardly for a similar purpose. A length of woven wire and relatively coarse mesh has been found ideal in forming the body 5 and when such material is used, it is reinforced against transverse strain by the provision of metallic plates 10 and 11 disposed over the opposite faces of the upwardly bent end portions 8, the plates being secured thereto in any preferred manner as by bolts 12 and nuts 13. Provision is made for reinforcing the body 5 in the direction of its length by the employment of series of longitudinally disposed metallic rods 14 which are arranged in parallel spaced relation over the upper face of the body, the opposite end portions of these rods being upturned and directed into the space between the plates 10 and 11 where they are held against displacement by the clamping action of the bolts and nuts. The handle *b* extends obliquely upward from one end portion of the body and may be secured thereto at its lower end in any preferred manner as by a handle support 15 herein shown as formed of a single length of metal, its opposite end portions 16 being bent to conform to the bending of the end portions 8 of the body and secured in any preferred manner as by one of the bolts and nuts 12 and 13. The lower end of the handle is shown as being provided with the usual socket, the terminal portion of which is flattened and secured by fastening devices such as bolts and nuts 17 and 18 to one end portion of the handle support 15.

In the use of the device of this invention the top dressing for a particular section of grass land to be treated is broadcasted or spread thereon in the usual manner after which the body portion *a* is worked back and forth over the top dressing by a back and forth motion imparted to the handle *b* by the operator. The construction of the lower face of the body operates to reduce whatever lumps may be present in the top dressing and at the same time lends itself to distributing such top dressing in an even layer over the surface of the ground. This property on the part of the body will be at once manifest from its foraminous construction in that hillocks of top dressing that may result from uneven casting of the same upon the land will be reduced by the action of the body *b* and the excess carried to areas where needed or into depressions in the surface of the ground. It will be noted that the action of the implement operates to direct the top dressing downwardly so that the fertilizing component is worked downwardly and toward the roots of the grass, and this without danger of uprooting, tearing or otherwise inflicting injury to the grass.

Although I have shown and described an ideal embodiment of my invention, it is to be understood that the same is susceptible of certain modifications; and I reserve the right to resort to such changes as may properly come within the scope of the appended claim.

I claim:

A dressing tool for lawns and the like comprising a body of foraminous material having a ground engaging surface and upturned opposite end portions and a handle connected to the said body.

MANUEL T. COELHO.